Feb. 13, 1923.  
J. W. PETERSON  
1,445,102  
FLANGED TUBE AND METHOD OF ATTACHING THE SAME  
Filed Apr. 10, 1922
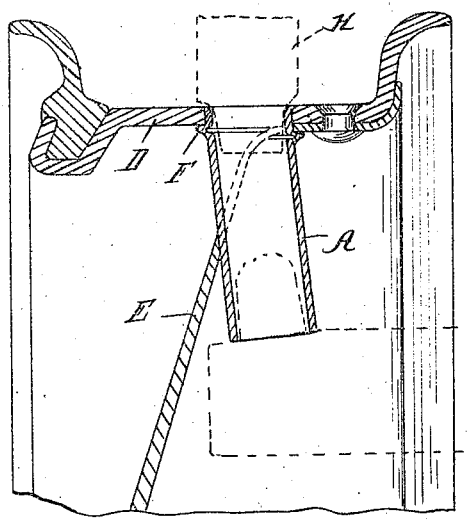
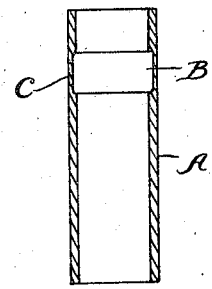
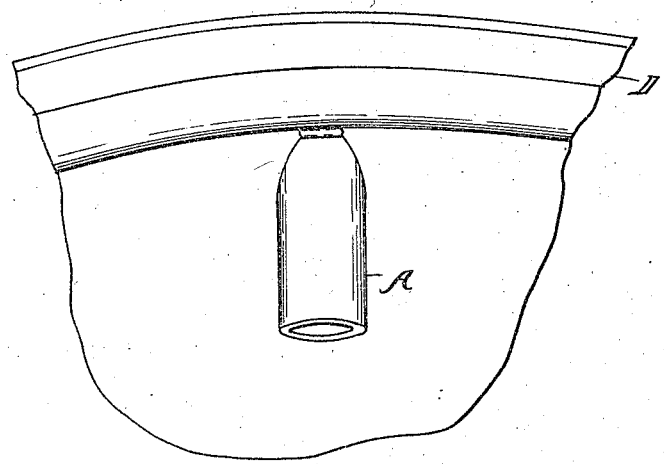
Inventor  
John W. Peterson Patented Feb. 13, 1923.

1,445,102

UNITED STATES PATENT OFFICE.

JOHN W. PETERSON, OF DETROIT, MICHIGAN, ASSIGNOR TO DETROIT PRESSED STEEL COMPANY, OF WILMINGTON, DELAWARE, A CORPORATION OF DELAWARE.

FLANGED TUBE AND METHOD OF ATTACHING THE SAME.

Application filed April 10, 1922. Serial No. 551,105.

*To all whom it may concern:*

Be it known that I, JOHN W. PETERSON, a citizen of the United States of America, residing at Detroit, in the county of Wayne and State of Michigan, have invented certain new and useful Improvements in Flanged Tubes and Methods of Attaching the Same, of which the following is a specification, reference being had therein to the accompanying drawings.

The invention relates to the manufacture of tubes which are provided with one or more outwardly projecting flanges intermediate the ends thereof forming shoulders for securing the tube to an associated part. It is the primary object of the invention to obtain a construction and method of forming the same which permits of inserting the tube into engagement with an associated part before the forming of the flange thereon and then flanging the tube by a simple upsetting operation. To this end the invention consists in the method and structure as hereinafter set forth.

In the drawings:

Figure 1 shows a portion of a disk vehicle wheel having a guide tube for the tire tube formed by my improved construction;

Figure 2 is a front elevation of Figure 1;

Figure 3 is a longitudinal section through the tube as formed prior to the upsetting operation.

As shown in Figure 3, A is a tube which has formed in its inner surface an annular groove B, leaving thinned walls C adjacent thereto. The tube A, as specifically shown, is designed as a guide for the tire tube, said guide extending from the tire rim D through the disk E and being preferably inclined to direct the tire tube towards the front or outer side of the wheel.

To secure such tube to the rim, it is necessary not only to rivet over the end portion, but also to provide an opposing abutment. This is readily accomplished by an upsetting pressure, which, when applied, will deflect outwardly the thin portions of the walls, as indicated at F. Where, as is shown, the guide tube passes through both the rim and a registering aperture in the disk and has portions of the upset on opposite sides of said disk, the opposite flange will automatically adjust itself to such a structure. Thus, as indicated in Figure 1, the tube A, after being inserted through the registering apertures in the rim and the disk E, is engaged at its inner end with an anvil G, indicated in dotted lines, and a punch H is engaged with the other end of the tube. Pressure is then applied to the punch, which will result in upsetting the thin portion of the tube and forming the bead F as shown. At the same time, the punch will flare the outer end of the tube so as to rivet the same to the rim.

While I have described the specific application of my invention to a guide tube, it is obvious that the same structure and method may have other uses.

What I claim as my invention is:

1. The method of flanging tubes intermediate the ends thereof, which consists in forming an annular groove to thin the wall of the tube at the point the flange is to be formed and then upsetting the tube to form the flange.

2. The method of flanging tubes intermediate the ends thereof, which consists in forming an annular groove around the inner surface of the tube at the point the flange is to be located and upsetting the tube to force the thinned portion of the wall outward.

3. The method of flanging tubes intermediate the ends thereof, which consists in forming an annular groove in the inner surface of the tube, thereby thinning the adjacent walls of the tube and in applying end pressure to the tube to upset said thinned wall outwardly.

4. The method of flanging tubes on opposite sides of a cooperating member through which the tube is passed, which consists in first grooving the inner surface of the tube to thin the wall thereof, threading the tube through the cooperating member and applying end pressure to upset the tube and deflect the flange outwardly therefrom, 5. A tube comprising an intermediate portion having the wall thereof thinned and outwardly deflected, to form a flange.

6. A flanged tube comprising portions of uniform cross-section and an intermediate portion of thin cross section, the latter being upset and outwardly deflected.

7. The method of flanging tubes which consists in annularly weakening the tube at a point intermediate the length thereof and subjecting the tube to end pressure to expand the weakened portion to a flanged form.

In testimony whereof I affix my signature.

JOHN W. PETERSON.